United States Patent
Sundararajan et al.

(10) Patent No.: US 12,401,482 B2
(45) Date of Patent: Aug. 26, 2025

(54) USER EQUIPMENT FEEDBACK ON NUMBER OF REPETITIONS NEEDED FOR DECODING

(71) Applicant: QUALCOMM Incorporated, San Diego, CA (US)

(72) Inventors: Jay Kumar Sundararajan, San Diego, CA (US); Yeliz Tokgoz, San Diego, CA (US); Nicolas Cornillet, Lannion (FR); Yi Huang, San Diego, CA (US); Hwan Joon Kwon, San Diego, CA (US); Yuchul Kim, San Diego, CA (US); Wilfred Ilamthy Dore, Gennevilliers (FR)

(73) Assignee: QUALCOMM Incorporated, San Diego, CA (US)

( * ) Notice: Subject to any disclaimer, the term of this patent is extended or adjusted under 35 U.S.C. 154(b) by 357 days.

(21) Appl. No.: 17/938,059

(22) Filed: Oct. 5, 2022

(65) Prior Publication Data
US 2023/0141159 A1    May 11, 2023

Related U.S. Application Data

(60) Provisional application No. 63/263,656, filed on Nov. 5, 2021.

(51) Int. Cl.
*H04L 5/00* (2006.01)
*H04L 1/08* (2006.01)

(52) U.S. Cl.
CPC .............. *H04L 5/0055* (2013.01); *H04L 1/08* (2013.01)

(58) Field of Classification Search
CPC ....... H04L 5/0055; H04L 1/08; H04L 1/0003; H04L 1/0009; H04L 1/0016; H04L 1/0017; H04L 5/0044; H04L 1/1819; H04L 1/1825; H04L 1/1864; H04L 1/189; H04L 1/1893; H04L 1/1896
USPC ......................................................... 370/329
See application file for complete search history.

(56) References Cited

U.S. PATENT DOCUMENTS

| | | | |
|---|---|---|---|
| 2016/0037540 A1* | 2/2016 | Johansson | H04L 1/00 370/329 |
| 2016/0269939 A1* | 9/2016 | Papasakellariou | H04L 1/189 |
| 2018/0241513 A1* | 8/2018 | Ahn | H03M 13/6306 |
| 2019/0230691 A1* | 7/2019 | Cao | H04L 5/0044 |
| 2019/0327064 A1* | 10/2019 | Hosseini | H04L 5/0082 |
| 2021/0014002 A1* | 1/2021 | Lovlekar | H04W 72/20 |
| 2022/0311547 A1* | 9/2022 | Fakoorian | H04L 1/1614 |
| 2023/0189298 A1* | 6/2023 | Lee | H04W 72/30 |
| 2023/0299874 A1* | 9/2023 | Bian | H04L 1/08 |

* cited by examiner

*Primary Examiner* — Rownak Islam
(74) *Attorney, Agent, or Firm* — Harrity & Harrity, LLP

(57) ABSTRACT

Various aspects of the present disclosure generally relate to wireless communication. In some aspects, a user equipment (UE) may receive a transport block (TB). The UE may fail to successfully decode the TB. The UE may transmit a negative acknowledgement (NACK) message based at least in part on the failing to successfully decode the TB. The NACK message may indicate a quantity of repetitions for retransmitting the TB. Numerous other aspects are described.

28 Claims, 10 Drawing Sheets

USER EQUIPMENT FEEDBACK ON NUMBER OF REPETITIONS NEEDED FOR DECODING

CROSS-REFERENCE TO RELATED APPLICATION

This Patent application claims priority to U.S. Provisional Patent Application No. 63/263,656, filed on Nov. 5, 2021, titled "USER EQUIPMENT FEEDBACK ON NUMBER OF REPETITIONS NEEDED FOR DECODING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for user equipment (UE) feedback on a number of repetitions needed for decoding.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network entities that support communication for a user equipment (UE) or multiple UEs. A UE may communicate with a network entity via downlink communications and uplink communications. "Downlink" (or "DL") refers to a communication link from the network entity to the UE, and "uplink" (or "UL") refers to a communication link from the UE to the network entity.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The user equipment may include memory, one or more processors coupled to the memory, and instructions stored in the memory and executable by the one or more processors. The instructions may be executable by the one or more processors to cause the user equipment to receive a transport block (TB). The instructions may be executable by the one or more processors to cause the user equipment to transmit, when the UE fails to successfully decode the TB, a negative acknowledgement (NACK) message, wherein the NACK message indicates a quantity of repetitions for retransmitting the TB.

Some aspects described herein relate to a network entity for wireless communication. The network entity may include memory, one or more processors coupled to the memory, and instructions stored in the memory and executable by the one or more processors. The instructions may be executable by the one or more processors to cause the network entity to transmit a TB to a UE, wherein the UE fails to successfully decode the TB. The instructions may be executable by the one or more processors to cause the network entity to receive a NACK message based at least in part on the UE failing to successfully decode the TB, wherein the NACK message indicates a quantity of repetitions for retransmitting the TB.

Some aspects described herein relate to a method of wireless communication performed by a UE. The method may include receiving a TB. The method may include transmitting, when the UE fails to successfully decode the TB, a NACK message, wherein the NACK message indicates a quantity of repetitions for retransmitting the TB.

Some aspects described herein relate to a method of wireless communication performed by a network entity. The method may include transmitting a TB to a UE, wherein the UE fails to successfully decode the TB. The method may include receiving a NACK message based at least in part on the UE failing to successfully decode the TB, wherein the NACK message indicates a quantity of repetitions for retransmitting the TB.

Some aspects described herein relate to a non-transitory computer-readable medium that stores one or more instructions for wireless communication by a UE. The one or more instructions, when executed by one or more processors of the UE, may cause the UE to receive a TB. The one or more instructions, when executed by one or more processors of the UE, may cause the UE to transmit, when the UE fails to successfully decode the TB, a NACK message, wherein the NACK message indicates a quantity of repetitions for retransmitting the TB.

Some aspects described herein relate to a non-transitory computer-readable medium that stores one or more instructions for wireless communication by a network entity. The one or more instructions, when executed by one or more processors of the network entity, may cause the network entity to transmit a TB to a UE, wherein the UE fails to successfully decode the TB. The one or more instructions, when executed by one or more processors of the network entity, may cause the network entity to receive a NACK message based at least in part on the UE failing to successfully decode the TB, wherein the NACK message indicates a quantity of repetitions for retransmitting the TB.

Some aspects described herein relate to an apparatus for wireless communication. The apparatus may include means for receiving a TB. The apparatus may include means for transmitting, when the apparatus fails to successfully decode the TB, a NACK message, wherein the NACK message indicates a quantity of repetitions for retransmitting the TB.

Some aspects described herein relate to an apparatus for wireless communication. The apparatus may include means for transmitting a TB to a UE, wherein the UE fails to successfully decode the TB. The apparatus may include means for receiving a NACK message based at least in part on the UE failing to successfully decode the TB, wherein the NACK message indicates a quantity of repetitions for retransmitting the TB.

Aspects generally include a method, apparatus, system, computer program product, non-transitory computer-readable medium, user equipment, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
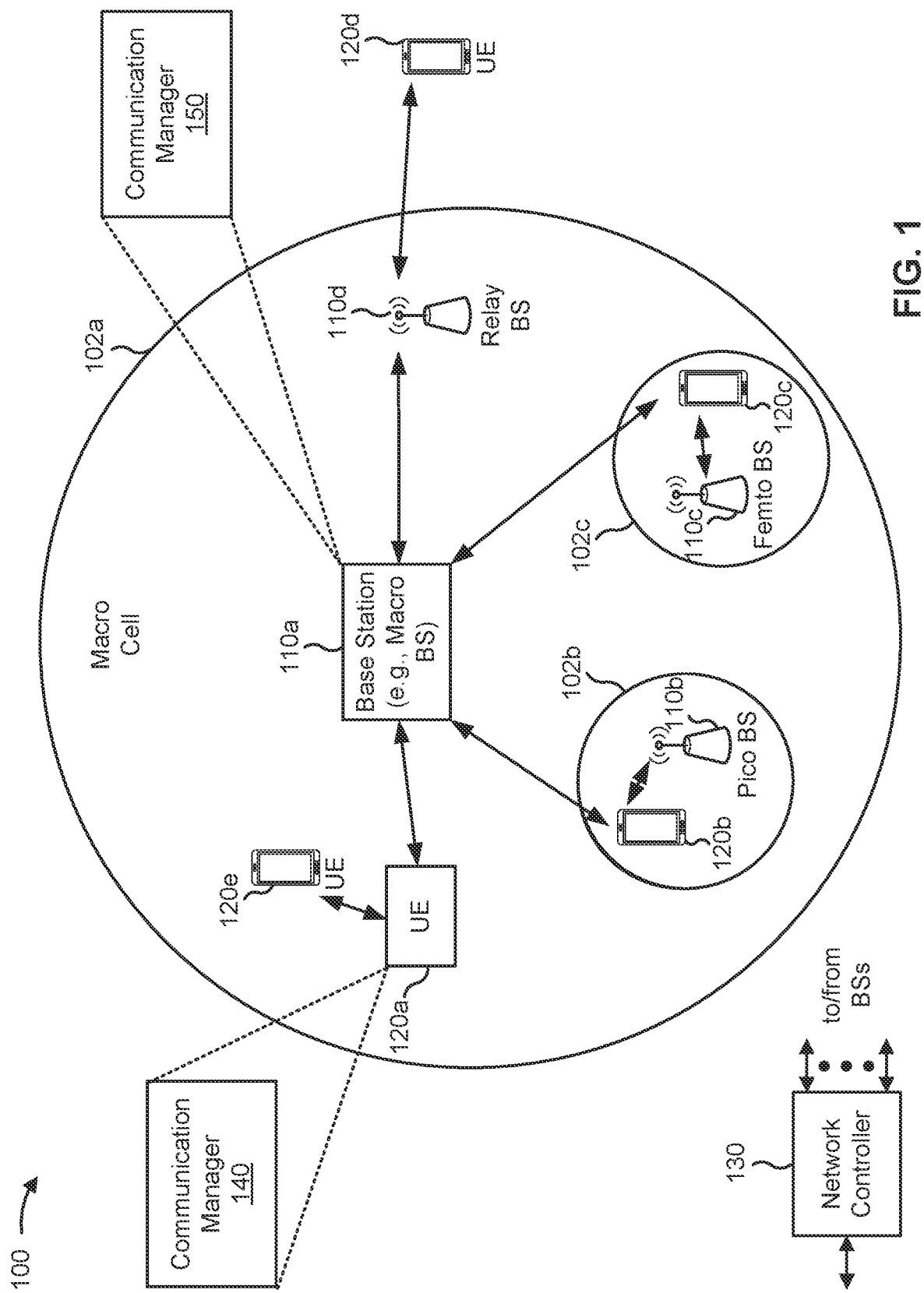
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network entities 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A network entity 110 is an entity that communicates with UEs 120. A network entity 110 (sometimes referred to as a BS) may include, for example, an NR base station, an LTE base station, a Node B, an eNB (e.g., in 4G), a gNB (e.g., in 5G), an access point, and/or a transmission reception point (TRP). Each network entity 110 may provide communication coverage for a particular geographic area. In the Third Generation Partnership Project (3GPP), the term "cell" can refer to a coverage area of a network entity 110 and/or a network entity subsystem serving this coverage area, depending on the context in which the term is used.

A network entity 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A network entity 110 for a macro cell may be referred to as a macro base station. A network entity 110 for a pico cell may be referred to as a pico base station. A network entity 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A network entity may support one or multiple (e.g., three) cells.

In some examples, a cell may not necessarily be stationary, and the geographic area of the cell may move according to the location of a network entity 110 that is mobile (e.g., a mobile network entity). In some examples, the network entities 110 may be interconnected to one another and/or to one or more other network entities 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a network entity 110 or a UE 120) and send a transmission of the data to a downstream station (e.g., a UE 120 or a network entity 110). A relay station may be a UE 120 that can relay transmissions for other UEs 120. In the example shown in FIG. 1, the BS 110d (e.g., a relay network entity) may communicate with the BS 110a (e.g., a macro base station) and the UE 120d in order to facilitate communication between the BS 110a and the UE 120d. A network entity 110 that relays communications may be referred to as a relay station, a relay base station, a relay, or the like.

The wireless network 100 may be a heterogeneous network that includes network entities 110 of different types, such as macro base stations, pico base stations, femto base stations, relay base stations, or the like. These different types of network entities 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of network entities 110 and may provide coordination and control for these network entities 110. The network controller 130 may communicate with the network entities 110 via a backhaul communication link. The network entities 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network entity, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network entity 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network entity 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a transport block (TB); fail to successfully decode the TB; and transmit a negative acknowledgement (NACK) message based at least in part on the failing to successfully decode the TB, wherein the NACK message indicates a quantity of repetitions for retransmitting the TB. Additionally, or alternatively, the communication manager 140 may perform one or more other operations described herein.

In some aspects, the network entity 110 may include a communication manager 150. As described in more detail elsewhere herein, the communication manager 150 may transmit a TB to a UE, wherein the UE fails to successfully decode the TB; and receive a NACK message based at least in part on the UE failing to successfully decode the TB, wherein the NACK message indicates a quantity of repetitions for retransmitting the TB. Additionally, or alternatively, the communication manager 150 may perform one or more other operations described herein.

As indicated above, FIG. 1 is provided as an example. Other examples may differ from what is described with regard to FIG. 1.

Figure 2:
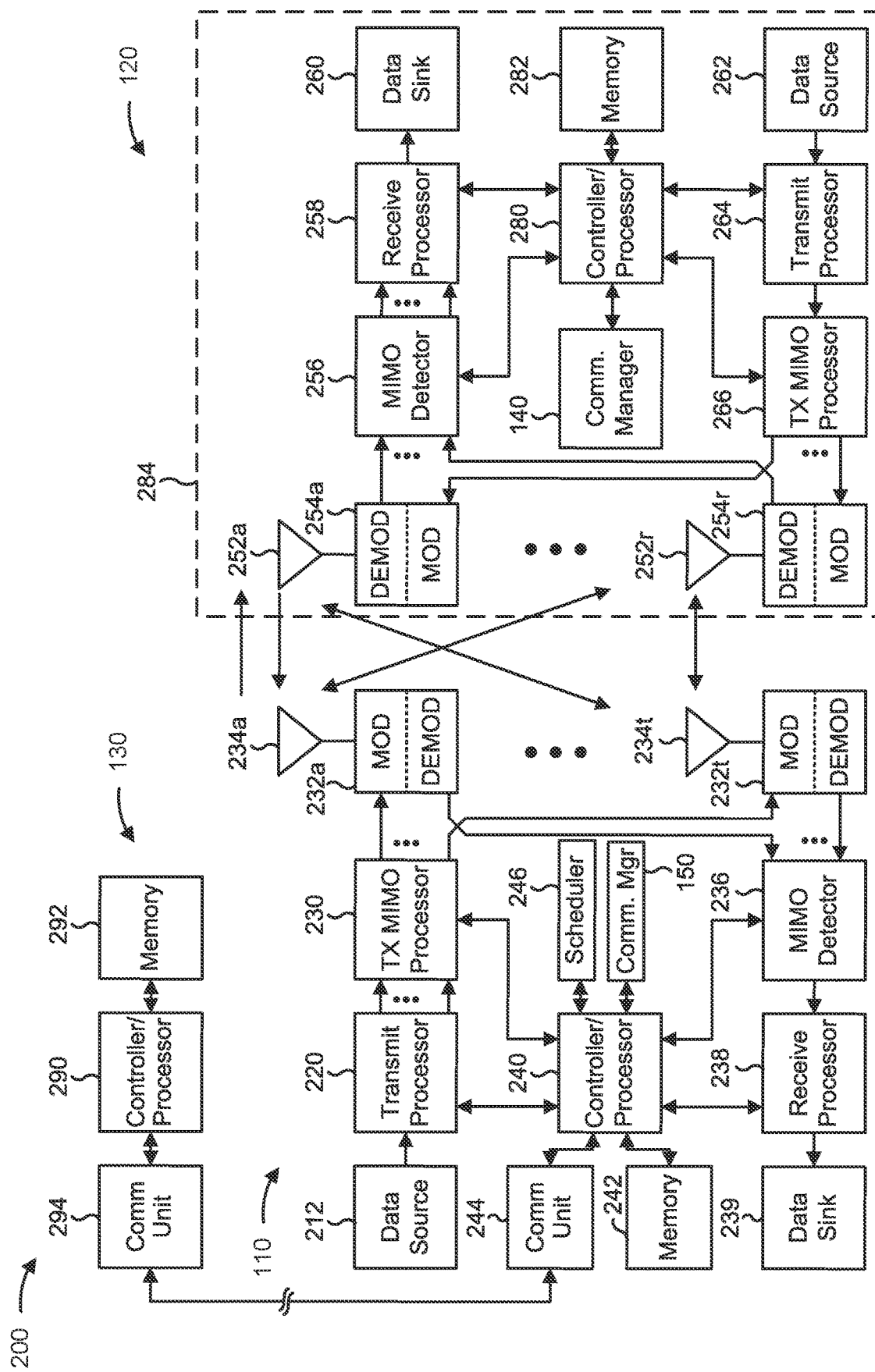
FIG. 2 is a diagram illustrating an example of a network entity in communication with a user equipment (UE) in a wireless network, in accordance with the present disclosure.

FIG. 2 is a diagram illustrating an example 200 of a network entity 110 in communication with a UE 120 in a wireless network 100, in accordance with the present disclosure. The network entity 110 may be equipped with a set of antennas 234a through 234t, such as T antennas (T≥1). The UE 120 may be equipped with a set of antennas 252a through 252r, such as R antennas (R≥1).

At the network entity 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network entity 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network entity 110 and/or other network entities 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network entity 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network entity 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-10).

At the network entity 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network entity 110 may include a communication unit 244 and may communicate with the network controller 130 via the communication unit 244. The network entity 110 may include a scheduler 246 to schedule one or more UEs 120 for downlink and/or uplink communications. In some examples, the modem 232 of the network entity 110 may include a modulator and a demodulator. In some examples, the network entity 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-10).

The controller/processor 240 of the network entity 110, the controller/processor 280 of the UE 120, and/or any other component(s) of FIG. 2 may perform one or more techniques associated with UE feedback on a number of repetitions needed for decoding, as described in more detail elsewhere herein. For example, the controller/processor 240 of the network entity 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network entity 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network entity 110 and/or the UE 120, may cause the one or more processors, the UE 120, and/or the network entity 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE includes means for receiving a TB; means for failing to successfully decode the TB; and/or means for transmitting a NACK message based at least in part on the failing to successfully decode the TB, wherein the NACK message indicates a quantity of repetitions for retransmitting the TB. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network entity includes means for transmitting a TB to a UE, wherein the UE fails to successfully decode the TB; and/or means for receiving a NACK message based at least in part on the UE failing to successfully decode the TB, wherein the NACK message indicates a quantity of repetitions for retransmitting the TB. The means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
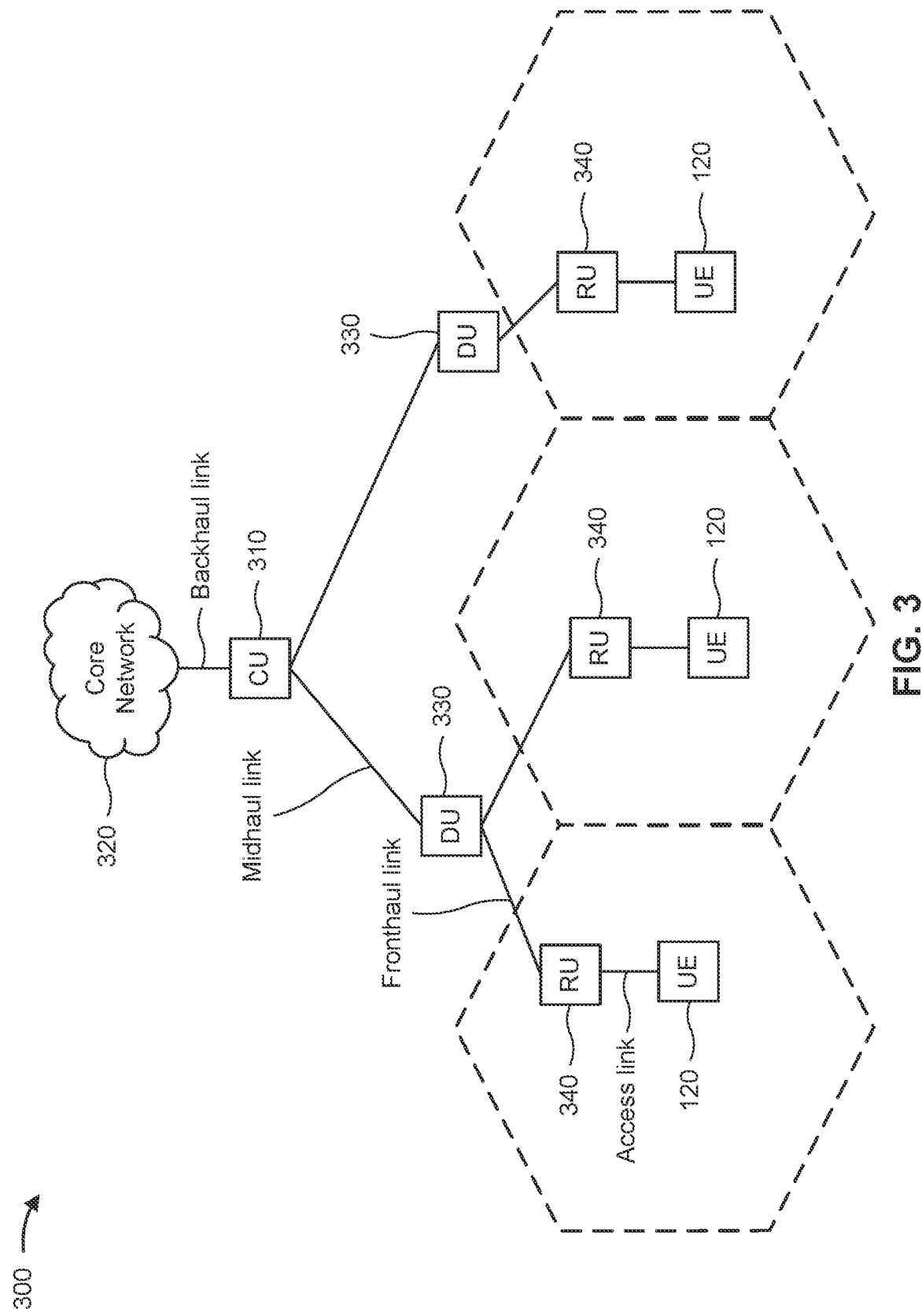
FIG. 3 is a diagram illustrating an example of an open radio access network (O-RAN) architecture, in accordance with the present disclosure.

FIG. 3 is a diagram illustrating an example 300 of an O-RAN architecture, in accordance with the present disclosure. As shown in FIG. 3, the O-RAN architecture may include a control unit (CU) 310 that communicates with a core network 320 via a backhaul link. Furthermore, the CU 310 may communicate with one or more DUs 330 via respective midhaul links. The DUs 330 may each communicate with one or more RUs 340 via respective fronthaul links, and the RUs 340 may each communicate with respective UEs 120 via radio frequency (RF) access links. The DUs 330 and the RUs 340 may also be referred to as O-RAN DUs (O-DUs) 330 and O-RAN RUs (O-RUs) 340, respectively.

In some aspects, the DUs 330 and the RUs 340 may be implemented according to a functional split architecture in which functionality of a network entity 110 (e.g., an eNB or a gNB) is provided by a DU 330 and one or more RUs 340 that communicate over a fronthaul link. Accordingly, as described herein, a network entity 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As indicated above, FIG. 3 is provided as an example. Other examples may differ from what is described with regard to FIG. 3.

A network entity may receive a TB to be transmitted to a UE. The network entity may identify a channel for transmitting the TB to the UE. The network entity may select resources and an MCS based on past information about the identified channel and may transmit the TB to the UE.

In some cases, the UE may fail to successfully decode the TB. The UE may transmit a hybrid automatic repeat request (HARD) NACK to the network entity. The network entity may receive the NACK and may retransmit the TB to the UE. However, the network entity may be unaware of the channel quality experienced by the TB and may retransmit the TB without repetition and/or using the same MCS. The UE may fail to successfully decode the retransmitted TB and may send another NACK to the network entity. In some cases, the process may continue in a similar manner for a number of iterations until the UE successfully receives and decodes the TB.

In some cases, the TB may be transmitted with a DMRS pilot, and the UE may be able to utilize the DMRS pilot to determine the channel quality experienced by the TB. Further, in cases where the UE is unable to successfully decode the TB, the UE may be able to compute a quantity of additional repetitions for retransmitting the TB that may be required for a specified reliability target (e.g., a probability of decoding). Because the network entity may be unaware that the TB should be transmitted with the additional quantity of repetitions, the network entity may retransmit the TB without repetitions which may result in multiple NACKs being transmitted by the UE before the UE is able to successfully decode the TB. Alternatively, the network entity may retransmit with repetitions for every TB for which a NACK is received. However, in cases where the quantity of retransmissions is more than required for a UE to successfully decode a TB, the extra retransmissions may result in an increased level of interference for other UEs in the network.

In some cases, the TB may be associated with a relatively small packet delay budget (PDB) (e.g., 10 ms or 15 ms) and a relatively high throughput (e.g., 60 Mbs). For example, the TB may be associated with augmented reality traffic, extended reality traffic, and/or virtual reality traffic. The repeated iterations described above may result in expiration of the PDB and/or a degraded user experience.

Some techniques and apparatuses described herein enable a UE to provide a quantity of additional repetitions of transmitting a TB to a network entity to enable the UE to successfully receive and decode the TB. As a result, the network entity may be able to make a more customized decision regarding a set of resources to be utilized to retransmit the TB to the UE. Enabling the network entity to make a more customized decision regarding the set of resources to be utilized to retransmit the TB to the UE may result in a beneficial tradeoff between latency in decoding the TB and an interference level associated with communicating the TB to the UE.

Figure 4:
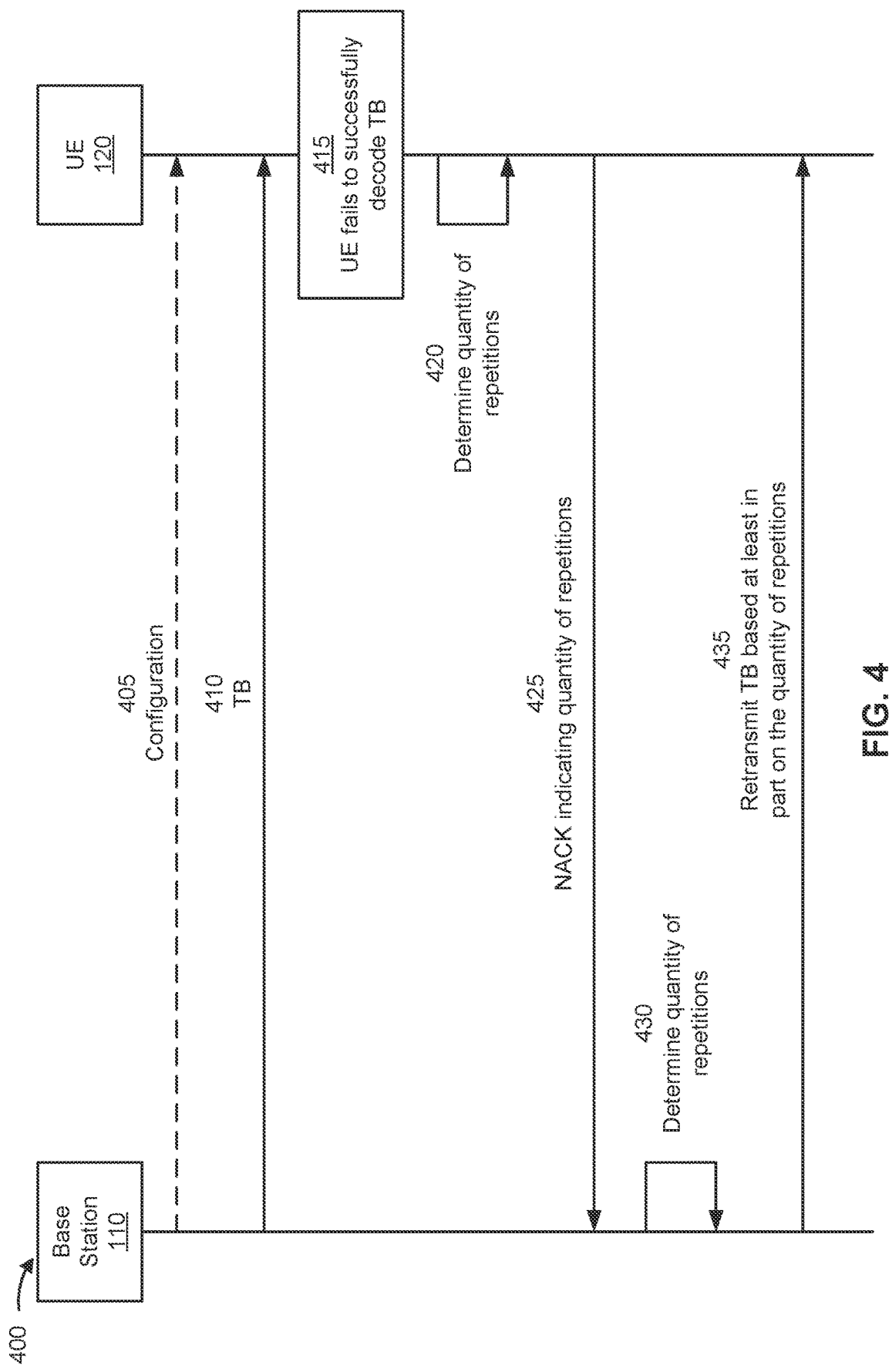
FIGS. 4-6 are diagrams illustrating examples associated with UE feedback on a number of repetitions needed for decoding, in accordance with the present disclosure.

FIG. 4 is a diagram illustrating an example 400 associated with UE feedback on a number of repetitions needed for decoding a TB, in accordance with the present disclosure. As shown in FIG. 4, example 400 includes communication between a network entity 110 and a UE 120. In some aspects, the network entity 110 and the UE 120 may be included in a wireless network, such as wireless network 100. The network entity 110 and the UE 120 may communicate via a wireless access link, which may include an uplink and a downlink.

In some aspects, as shown by reference number 405, the network entity 110 may transmit a configuration to the UE 120. The configuration may indicate that, when the UE 120 fails to successfully decode a TB, the UE 120 is to provide information indicating a quantity of repetitions associated with the network entity 110 retransmitting the TB to the UE 120.

In some aspects, the TB may include a single code block. The configuration may indicate that, when the UE 120 fails to successfully decode the code block, the UE 120 is to provide information indicating a quantity of repetitions associated with the network entity 110 retransmitting the code block to the UE 120.

In some aspects, the TB may include a plurality of code blocks. The configuration may indicate that, when the UE 120 fails to successfully decode a group of code blocks, of the plurality of code blocks (e.g., a code block group (CBG)), the UE 120 is to provide information indicating a quantity of repetitions associated with the network entity 110 retransmitting the CBG to the UE 120.

In some aspects, the configuration may indicate a type of traffic for which the UE 120 is to provide the information indicating the quantity of repetitions. In some aspects, the configuration may indicate that the UE 120 is to provide the information indicating the quantity of repetitions for TBs associated with a relatively small PDB (e.g., a PDB that satisfies a threshold (e.g., less than or equal to 10 ms or 15 ms, among other examples)) and/or is associated with a relatively high throughput requirement (e.g., a throughput requirement that satisfies a threshold (e.g., greater than or equal to 60 Mbs or 100 Mbs, among other examples)). For example, the configuration may indicate that the UE 120 is to provide the information indicating the quantity of repetitions for TB associated with augmented reality traffic (e.g., traffic associated with an augmented reality application), virtual reality traffic (e.g., traffic associated with a virtual reality application), or extended reality traffic (e.g., traffic associated with an extended reality application), among other examples.

As shown by reference number 410, the network entity 110 may transmit a TB to the UE 120. As shown by reference number 415, the UE 120 may fail to successfully decode the TB. In some aspects, the UE 120 may fail to successfully decode the TB based at least in part on one or more traffic conditions associated with a channel via which the TB was received.

As shown by reference number 420, the UE 120 may determine a quantity of repetitions for the UE 120 to successfully decode the TB. In some aspects, the UE 120 may determine the quantity of repetitions based at least in part on the UE 120 failing to successfully decode the TB.

In some aspects, the UE 120 may determine the quantity of repetitions based at least in part on the TB being associated with a type of traffic indicated in the configuration. For example, the configuration may indicate that the UE 120 is to provide information indicating a quantity of repetitions for TBs associated with a type of traffic (e.g., virtual reality traffic, augmented reality traffic, or extended reality traffic, among other examples). The UE 120 may determine that the TB is associated with the type of traffic indicated by the configuration. The UE 120 may determine the quantity of repetitions based at least in part on the TB being associated with the type of traffic indicated by the configuration.

In some aspects, the UE 120 may determine the quantity of repetitions based at least in part on one or more channel metrics associated with the channel via which the TB was communicated (e.g., transmitted by the network entity 110 and/or received by the UE 120). In some aspects, the one or more channel metrics may include a signal-to-interference-plus-noise ratio (SINR) experienced by the TB, a frequency variation in an SINR experienced by one or more TBs communicated via the channel, and/or a spatial variation in the SINR experienced by the one or more TBs communicated via the channel, among other examples.

As an example, the UE 120 may determine the quantity of repetitions for the UE 120 to successfully decode the TB based at least in part on an SINR experienced by the TB over the channel via which the TB was transmitted. In some aspects, the UE 120 may determine a difference between the SINR experienced by the TB over the channel via which the TB was transmitted and an SINR associated with decoding the TB for the MCS associated with the communication of the TB. In some aspects, the UE 120 may determine the SINR associated with decoding the TB for the MCS associated with the transmission of the TB based at least in part on a lookup table.

For example, the configuration received from the network entity 110 may indicate a lookup table to be utilized by the UE 120 to determine the quantity of repetitions. The lookup table may associate MCS values with values of one or more channel metrics associated with decoding a TB. For example, the lookup table may associate an MCS value for the TB with a target reliability value and/or an SINR value, among other examples, associated with decoding the TB for the MCS value.

In some aspects, the UE 120 may determine a difference between the SINR experienced by the TB over the channel via which the TB was transmitted and an SINR value indicated by the lookup table for the MCS associated with the TB. The UE 120 may determine the quantity of repetitions based at least in part on the difference between the SINR experienced by the TB over the channel via which the TB was transmitted and an SINR value indicated by the lookup table for the MCS associated with the TB.

In some aspects, the UE 120 may determine the quantity of repetitions based at least in part on a frequency variation associated with the SINR experienced by the TB, and/or one or more previously received TBs, transmitted via the channel via which the TB was communicated. In some aspects, the UE 120 may determine the quantity of repetitions based at least in part on a spatial variation associated with the SINR experienced by the TB, and/or one or more previously received TBs, transmitted via the channel via which the TB was communicated.

In some aspects, the UE 120 may determine the quantity of repetitions based at least in part on a channel quality associated with a channel via which the TB was communicated. In some aspects, the TB is transmitted with a DMRS pilot. The UE 120 may determine a channel quality experienced by the TB based at least in part on the DMRS pilot. The UE 120 may determine the quantity of repetitions based at least in part on the channel quality experienced by the TB.

As shown by reference number 425, the UE 120 may transmit a NACK message indicating the quantity of retransmissions to the network entity 110. In some aspects, the NACK message may indicate the actual quantity of repetitions. For example, the NACK message may include a field containing a set of bits indicating the actual quantity of repetitions determined by the UE 120.

In some aspects, the NACK message may indicate a quantized version of the quantity of repetitions determined by the UE 120. As an example, the NACK message may include a field containing two bits. The two bits may be set to a first value to indicate a first range of repetitions (e.g., 1 repetition). The two bits may be set to a second value to indicate a second range of repetitions (e.g., 2 repetitions). The two bits may be set to a third value to indicate a third range of repetitions (e.g., more than 2 repetitions).

In some aspects, the NACK message may indicate a redundancy version associated with the quantity of repetitions. The redundancy version may be the same as, or different from, the redundancy version associated with the communication of the TB.

As shown by reference number 430, the network entity 110 may determine a quantity of repetitions for retransmitting the TB. In some aspects, the network entity 110 may determine the quantity of repetitions based at least in part on the quantity of repetitions indicated by the NACK message. For example, the network entity 110 may determine the quantity of repetitions for retransmitting the TB to be the same as, less than, or greater than the quantity of repetitions indicated by the NACK message.

In some aspects, the network entity 110 may determine the quantity of repetitions for retransmitting the TB to the UE 120 based at least in part on a set of retransmission resources available for retransmitting the TB. For example, the network entity 110 may determine whether a set of retransmission resources available for retransmitting the TB are sufficient for transmitting the quantity of repetitions of the TB indicated by the NACK message. The network entity 110 may determine the quantity of repetitions for retransmitting the TB as being equal to the quantity of repetitions indicated by the NACK when the set of retransmission resources available for retransmitting the TB are sufficient for transmitting the quantity of repetitions of the TB indicated by the NACK message.

As shown by reference number 435, the network entity 110 may communicate the quantity of repetitions of the TB to the UE 120. For example, the network entity 110 may retransmit the TB to the UE 120 and may repeat the retransmission a quantity of times until the total quantity of times that the TB is retransmitted is equal to the quantity of repetitions indicated by the NACK message and/or determined by the network entity 110. The network entity 110 may repeat the retransmission of the UE 120 without waiting to receive an acknowledgement (ACK) or a NACK from the UE 120 with respect to each retransmission.

As indicated above, FIG. 4 is provided as an example. Other examples may differ from what is described with respect to FIG. 4.

Figure 5:
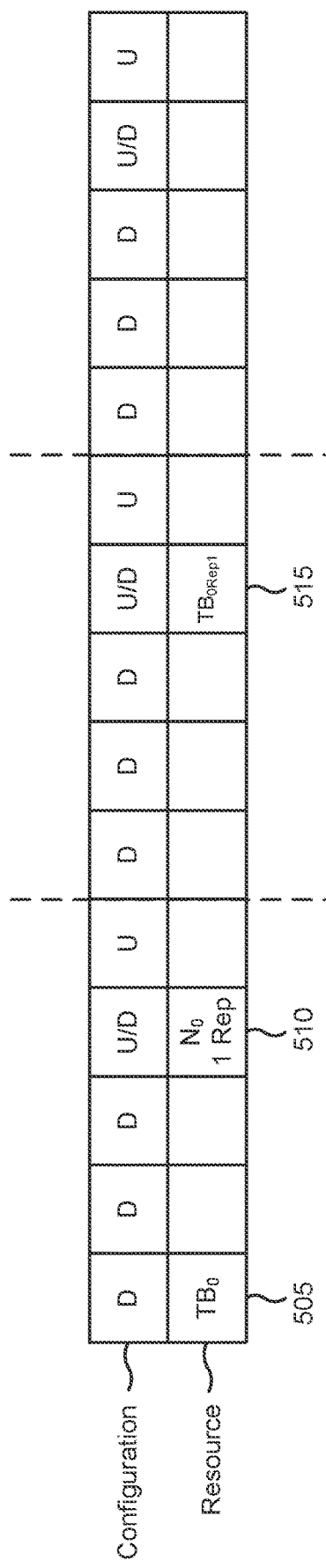

FIG. 5 is a diagram illustrating example 500 associated with UE feedback on a number of repetitions needed for decoding a TB, in accordance with the present disclosure. Example 500 includes communication between a network entity 110 and a UE 120. In some aspects, the network entity 110 and the UE 120 may be included in a wireless network, such as wireless network 100. The network entity 110 and the UE 120 may communicate via a wireless access link, which may include an uplink and a downlink.

As shown by reference number 505, the network entity 110 transmits a TB (e.g., $TB_0$, as shown) to the UE 120 via a resource configured for downlink communications (indicated by D in FIG. 5). In some aspects, the TB may be received by the UE 120, and the UE 120 may fail to successfully decode the TB. The UE 120 may determine a quantity of repetitions for retransmitting the TB based at least in part on failing to successfully decode the TB.

In some aspects, the UE 120 may determine the quantity of transmissions in a manner similar to that described elsewhere herein. For example, the UE 120 may estimate an SINR experienced by the TB. The UE 120 may determine that the SINR experienced by the TB is close to an SINR associated with successfully decoding the TB for the MCS associated with the TB (e.g., a difference between the SINR experienced by the TB and the SINR associated with successfully decoding the TB for the MCS satisfies a threshold). The UE 120 may determine the quantity of repetitions to correspond to one repetition based at least in part on the SINR experienced by the TB being close to an SINR associated with successfully decoding the TB for the MCS.

As shown by reference number 510, the UE 120 may transmit, to the network entity 110, a NACK (e.g., $N_0$, as shown) via a resource configured as a resource that includes both uplink and downlink symbols (e.g., a resource that may be utilized for uplink communications and/or downlink communications, indicated as U/D in FIG. 5). The NACK may indicate the quantity of repetitions determined by the UE 120.

The network entity 110 may receive the NACK and may determine a quantity of repetitions for retransmitting the TB to the UE 120 based at least in part on the quantity of repetitions determined by the UE 120. In some aspects, the network entity 110 may determine the quantity of repetitions for retransmitting the TB in a manner similar to that described elsewhere herein.

For example, the network entity 110 may determine the quantity of repetitions for retransmitting the TB to correspond to the quantity of repetitions determined by the UE 120. As shown by reference number 515, the TB (e.g., $TB_{0Rep1}$, as shown) may be retransmitted a single time to the UE 120 based at least in part on the NACK message indicating the quantity of repetitions.

As indicated above, FIG. 5 is provided as an example. Other examples may differ from what is described with respect to FIG. 5.

Figure 6:
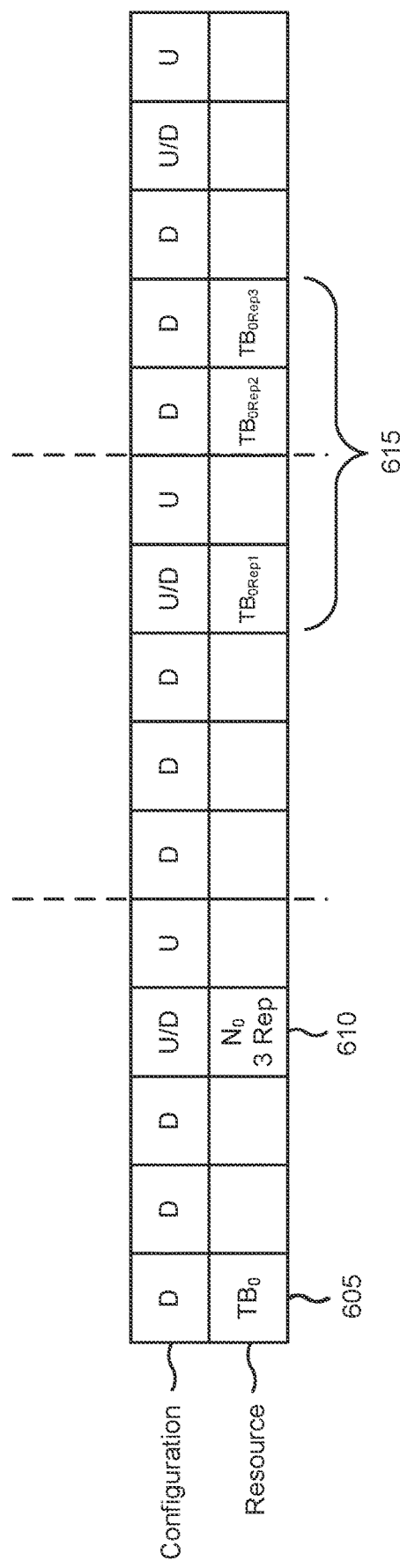

FIG. 6 is a diagram illustrating example 600 associated with UE feedback on a number of repetitions needed for decoding a TB, in accordance with the present disclosure. Example 600 includes communication between a network entity 110 and a UE 120. In some aspects, the network entity 110 and the UE 120 may be included in a wireless network, such as wireless network 100. The network entity 110 and the UE 120 may communicate via a wireless access link, which may include an uplink and a downlink.

As shown by reference number 605, the network entity 110 may transmit a TB (e.g., $TB_0$, as shown) to the UE 120 via a resource configured for downlink communications. In some aspects, the TB may be received by the UE 120, and the UE 120 may fail to successfully decode the TB. The UE 120 may determine a quantity of repetitions for retransmitting the TB based at least in part on failing to successfully decode the TB.

In some aspects, the UE 120 may determine the quantity of transmissions in a manner similar to that described elsewhere herein. For example, the UE 120 may estimate an SINR experienced by the TB. The UE 120 may determine that the SINR experienced by the TB is much lower than an SINR associated with successfully decoding the TB for the MCS associated with the TB (e.g., a difference between the SINR experienced by the TB and the SINR associated with successfully decoding the TB for the MCS satisfies a threshold). The UE 120 may determine the quantity of repetitions to correspond to three repetitions based at least in part on the SINR experienced by the TB being much lower than the SINR associated with successfully decoding the TB for the MCS.

As shown by reference number 610, the UE 120 may transmit, to the network entity 110, a NACK (e.g., $N_0$, as shown) via a resource configured as a resource that includes uplink symbols and downlink symbols. The NACK may include an indication of the quantity of repetitions determined by the UE 120.

The network entity 110 may receive the NACK and may determine a quantity of repetitions for retransmitting the TB to the UE 120 based at least in part on the quantity of repetitions determined by the UE 120. In some aspects, the network entity 110 may determine the quantity of repetitions for retransmitting the TB in a manner similar to that described elsewhere herein.

For example, the network entity 110 may determine the quantity of repetitions for retransmitting the TB to correspond to the quantity of repetitions determined by the UE 120. As shown by reference number 615, the network entity 110 may transmit three repetitions of the TB (e.g., $TB_{0Rep1}$, $TB_{0Rep2}$, and $TB_{0Rep3}$, as shown) to the UE 120 based at least in part on the NACK message indicating the quantity of repetitions.

As indicated above, FIG. 6 is provided as an example. Other examples may differ from what is described with respect to FIG. 6.

Figure 7:
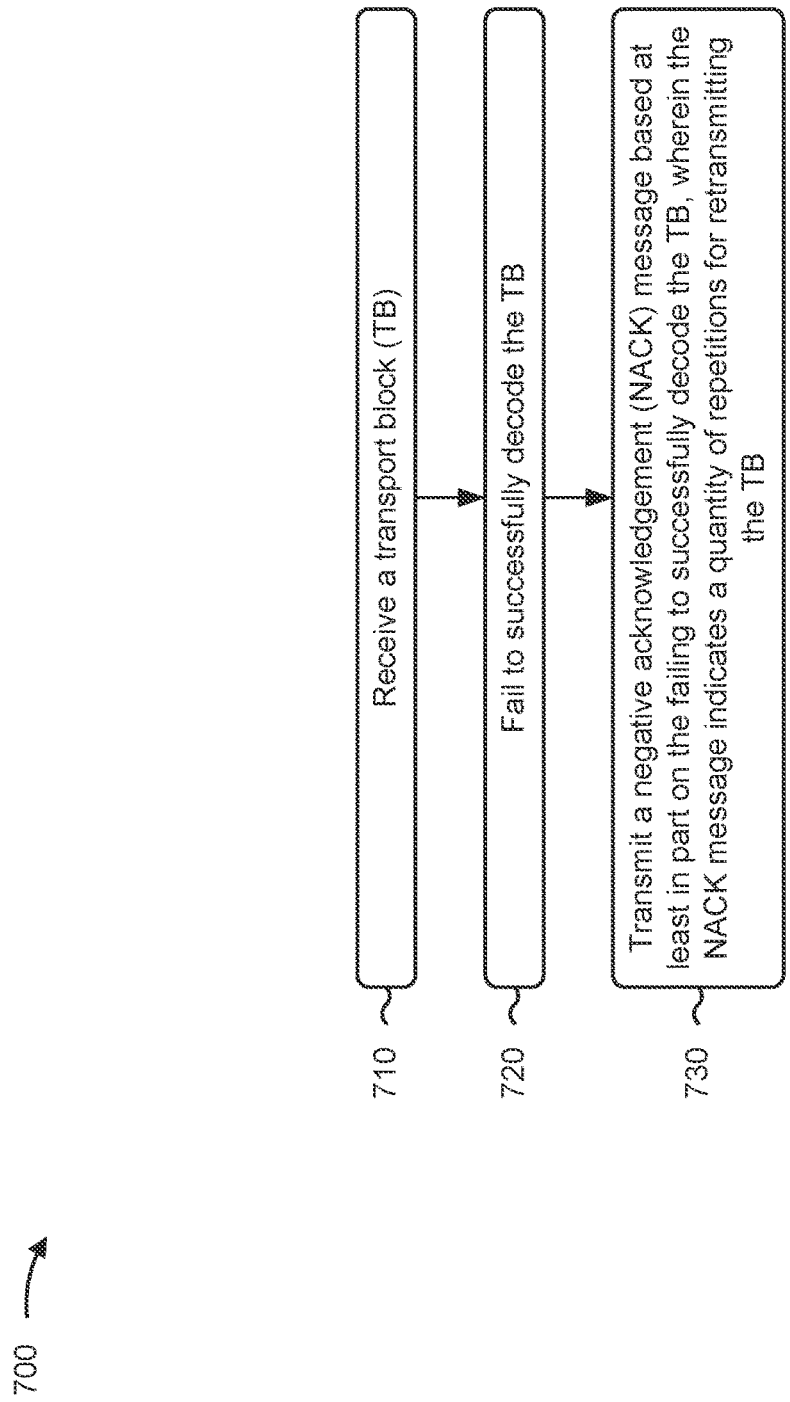
FIGS. 7 and 8 are diagrams illustrating example processes associated with UE feedback on a number of repetitions needed for decoding, in accordance with the present disclosure.

FIG. 7 is a diagram illustrating an example process 700 performed, for example, by a UE, in accordance with the present disclosure. Example process 700 is an example where the UE (e.g., UE 120) performs operations associated with UE feedback on a number of repetitions needed for decoding a TB.

As shown in FIG. 7, in some aspects, process 700 may include receiving a TB (block 710). For example, the UE (e.g., using communication manager 140 and/or reception component 902, depicted in FIG. 9) may receive a TB, as described above.

As further shown in FIG. 7, in some aspects, process 700 may include failing to successfully decode the TB (block 720). For example, the UE (e.g., using communication manager 140 and/or decode component 908, depicted in FIG. 9) may fail to successfully decode the TB, as described above.

As further shown in FIG. 7, in some aspects, process 700 may include transmitting a NACK message based at least in part on the failing to successfully decode the TB, wherein the NACK message indicates a quantity of repetitions for retransmitting the TB (block 730). For example, the UE (e.g., using communication manager 140 and/or transmission component 904, depicted in FIG. 9) may transmit a NACK message based at least in part on the failing to successfully decode the TB, wherein the NACK message indicates a quantity of repetitions for retransmitting the TB, as described above.

Process 700 may include additional aspects, such as any single aspect or any combination of aspects described below and/or in connection with one or more other processes described elsewhere herein.

In a first aspect, the quantity of repetitions is determined based at least in part on a first SINR associated with receiving the TB and a second SINR associated with decoding the TB for a modulation and coding scheme value associated with the TB.

In a second aspect, alone or in combination with the first aspect, the quantity of repetitions is determined further based at least in part on one or more of a frequency variation associated with the first SINR or a spatial variation associated with the first SINR.

In a third aspect, alone or in combination with one or more of the first and second aspects, the TB is transmitted with a DMRS pilot, wherein a channel quality experienced by the TB is determined based at least in part on the DMRS pilot, and wherein the quantity of repetitions is determined based at least in part on the channel quality experienced by the TB.

In a fourth aspect, alone or in combination with one or more of the first through third aspects, the UE is configured with a lookup table for determining the quantity of repetitions based at least in part on one or more channel metrics associated with a channel via which the TB was received, the method further comprising utilizing the lookup table to determine the quantity of repetitions.

In a fifth aspect, alone or in combination with one or more of the first through fourth aspects, the UE is configured with a target reliability associated with the UE receiving the TB, the method further comprising determining the quantity of repetitions based at least in part on the target reliability.

In a sixth aspect, alone or in combination with one or more of the first through fifth aspects, process 700 includes receiving a quantity of retransmissions of the TB, wherein the quantity of retransmissions of the TB is received via a set of resources, and wherein the set of resources is determined based at least in part on the quantity of repetitions indicated in the NACK message.

In a seventh aspect, alone or in combination with one or more of the first through sixth aspects, the quantity of repetitions includes a range of values.

In an eighth aspect, alone or in combination with one or more of the first through seventh aspects, process 700 includes receiving a quantity of retransmissions of the TB, wherein the quantity of retransmissions of the TB corresponds to the quantity of repetitions indicated in the NACK message.

In a ninth aspect, alone or in combination with one or more of the first through eighth aspects, process 700 includes receiving a quantity of retransmissions of the TB, wherein the quantity of retransmissions of the TB is different than the quantity of repetitions indicated in the NACK message.

In a tenth aspect, alone or in combination with one or more of the first through ninth aspects, the NACK message indicates a redundancy version associated with the quantity of repetitions.

In an eleventh aspect, alone or in combination with one or more of the first through tenth aspects, the redundancy version associated with the quantity of repetitions is different than a redundancy version associated with receiving the TB.

In a twelfth aspect, alone or in combination with one or more of the first through eleventh aspects, the redundancy version associated with the quantity of repetitions is the same as a redundancy version associated with receiving the TB.

In a thirteenth aspect, alone or in combination with one or more of the first through twelfth aspects, process 700 includes receiving a configuration indicating a type of traffic for which the quantity of repetitions is determined, wherein the TB is associated with the type of traffic.

In a fourteenth aspect, alone or in combination with one or more of the first through thirteenth aspects, the type of traffic includes one or more of augmented reality traffic, virtual reality traffic, or extended reality traffic.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
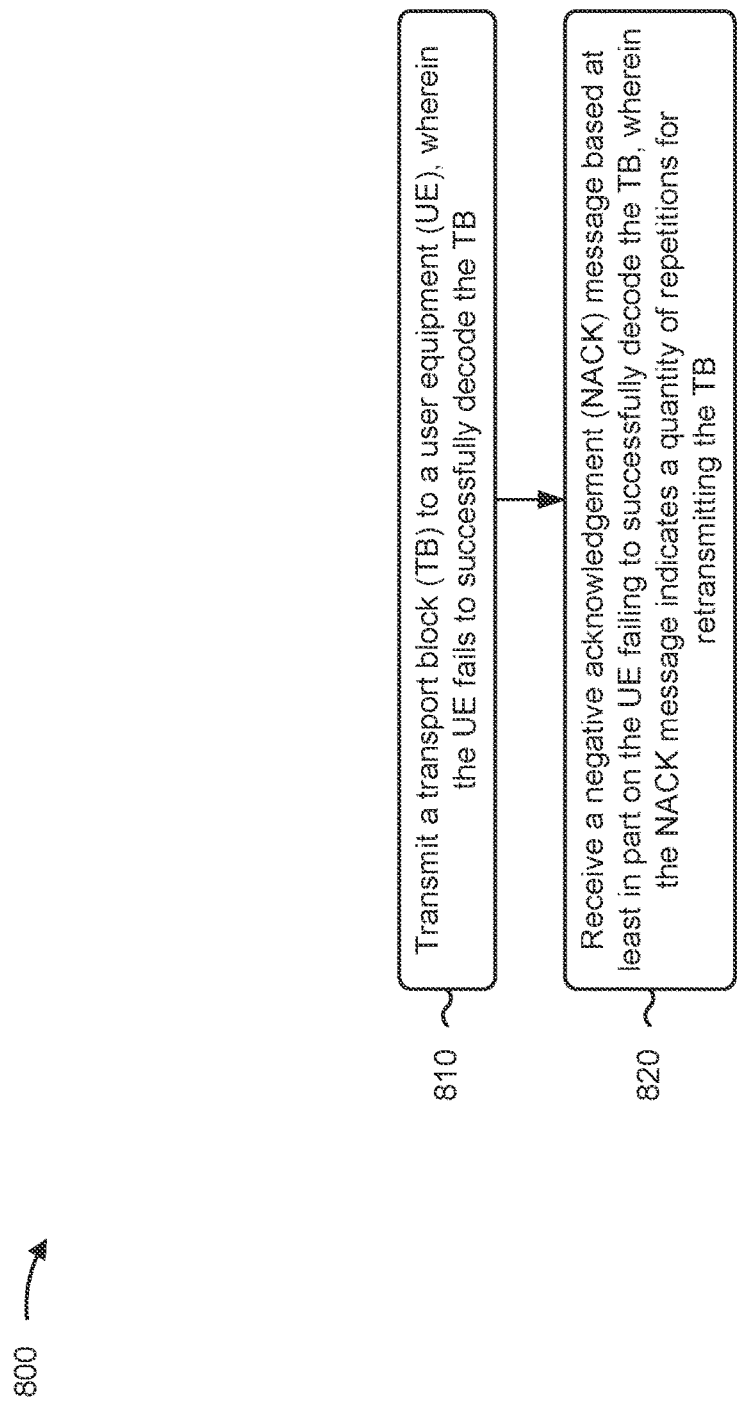

FIG. 8 is a diagram illustrating an example process 800 performed, for example, by a network entity, in accordance with the present disclosure. Example process 800 is an example where the network entity (e.g., network entity 110) performs operations associated with UE feedback on a number of repetitions needed for decoding a TB.

As shown in FIG. 8, in some aspects, process 800 may include transmitting a TB to a UE, wherein the UE may fail to successfully decode the TB (block 810). For example, the network entity (e.g., using communication manager 150 and/or transmission component 1004, depicted in FIG. 10) may transmit a TB to a UE, wherein the UE fails to successfully decode the TB, as described above.

As further shown in FIG. 8, in some aspects, process 800 may include receiving a NACK message based at least in part on the UE failing to successfully decode the TB (or receiving a NACK message, when the UE fails to successfully decode the TB), wherein the NACK message indicates a quantity of repetitions for retransmitting the TB (block 820). For example, the network entity (e.g., using communication manager 150 and/or reception component 1002, depicted in FIG. 10) may receive a NACK message based at least in part on the UE failing to successfully decode the TB, wherein the NACK message indicates a quantity of repetitions for retransmitting the TB, as described above.

Process 800 may include additional aspects, such as any single aspect or any combination of aspects described below and/or in connection with one or more other processes described elsewhere herein.

In a first aspect, the quantity of repetitions is determined based at least in part on a first SINR associated with transmitting the TB and a second SINR associated with the UE decoding the TB for a modulation and coding scheme value associated with the TB.

In a second aspect, alone or in combination with the first aspect, the quantity of repetitions is determined further based at least in part on one or more of a frequency variation associated with the first SINR or a spatial variation associated with the first SINR.

In a third aspect, alone or in combination with one or more of the first and second aspects, the TB is transmitted with a DMRS pilot, wherein a channel quality experienced by the TB is determined based at least in part on the DMRS pilot, and wherein the quantity of repetitions is determined based at least in part on the channel quality experienced by the TB.

In a fourth aspect, alone or in combination with one or more of the first through third aspects, process 800 includes configuring the UE with a lookup table for determining the quantity of repetitions based at least in part on one or more channel metrics associated with a channel via which the TB was received.

In a fifth aspect, alone or in combination with one or more of the first through fourth aspects, process 800 includes configuring the UE with a target reliability associated with the UE receiving the TB.

In a sixth aspect, alone or in combination with one or more of the first through fifth aspects, process 800 includes transmitting a quantity of retransmissions of the TB, wherein the quantity of retransmissions of the TB is transmitted via a set of resources, and wherein the set of resources is determined based at least in part on the quantity of repetitions indicated in the NACK message.

In a seventh aspect, alone or in combination with one or more of the first through sixth aspects, the quantity of repetitions includes a range of values.

In an eighth aspect, alone or in combination with one or more of the first through seventh aspects, process 800 includes transmitting a quantity of retransmissions of the TB, wherein the quantity of retransmissions of the TB corresponds to the quantity of repetitions indicated in the NACK message.

In a ninth aspect, alone or in combination with one or more of the first through eighth aspects, process 800 includes transmitting a quantity of retransmissions of the TB, wherein the quantity of retransmissions of the TB is different than the quantity of repetitions indicated in the NACK message.

In a tenth aspect, alone or in combination with one or more of the first through ninth aspects, the NACK message indicates a redundancy version associated with the quantity of repetitions.

In an eleventh aspect, alone or in combination with one or more of the first through tenth aspects, the redundancy version associated with the quantity of repetitions is different than a redundancy version associated with receiving the TB.

In a twelfth aspect, alone or in combination with one or more of the first through eleventh aspects, the redundancy version associated with the quantity of repetitions is the same as a redundancy version associated with receiving the TB.

In a thirteenth aspect, alone or in combination with one or more of the first through twelfth aspects, process 800 includes transmitting a configuration indicating a type of traffic for which the quantity of repetitions is determined, wherein the TB is associated with the type of traffic.

In a fourteenth aspect, alone or in combination with one or more of the first through thirteenth aspects, the type of traffic includes one or more of augmented reality traffic, virtual reality traffic, or extended reality traffic.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
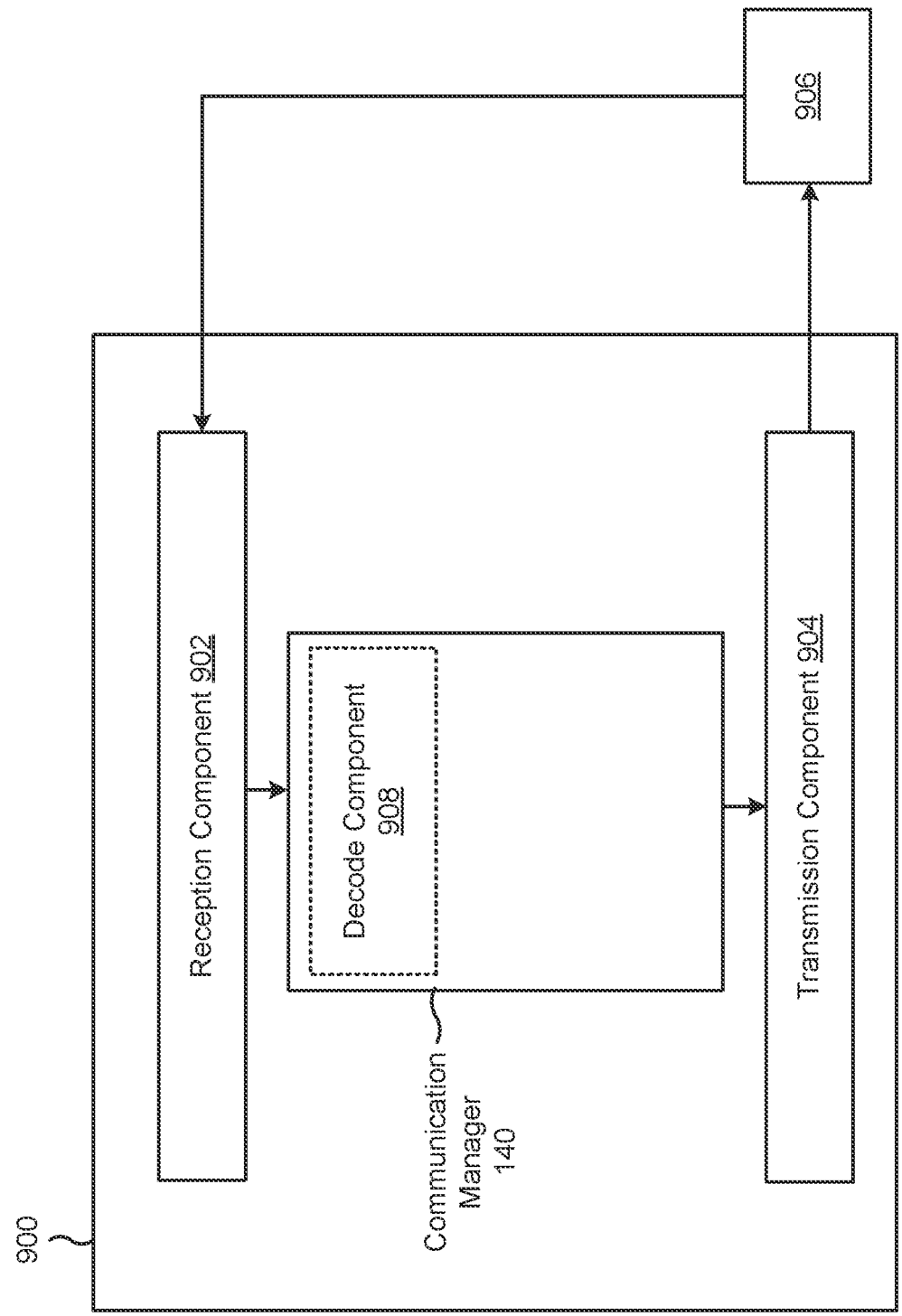
FIGS. 9 and 10 are diagrams of example apparatuses for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a network entity, or another wireless communication device) using the reception component 902 and the transmission component 904. As further shown, the apparatus 900 may include the communication manager 140. The communication manager 140 may include a decode component 908, among other examples.

In some aspects, the apparatus 900 may be configured to perform one or more operations described herein in connection with FIGS. 4-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive a TB. The decode component 908 may fail to successfully decode the TB. The transmission component 904 may transmit a NACK message based at least in part on the failing to successfully decode the TB, wherein the NACK message indicates a quantity of repetitions for retransmitting the TB.

The reception component 902 may receive a quantity of retransmissions of the TB, wherein the quantity of retransmissions of the TB is received via a set of resources, and wherein the set of resources is determined based at least in part on the quantity of repetitions indicated in the NACK message.

The reception component 902 may receive a quantity of retransmissions of the TB, wherein the quantity of retransmissions of the TB corresponds to the quantity of repetitions indicated in the NACK message.

The reception component 902 may receive a quantity of retransmissions of the TB, wherein the quantity of retransmissions of the TB is different than the quantity of repetitions indicated in the NACK message.

The reception component 902 may receive a configuration indicating a type of traffic for which the quantity of repetitions is determined, wherein the TB is associated with the type of traffic.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
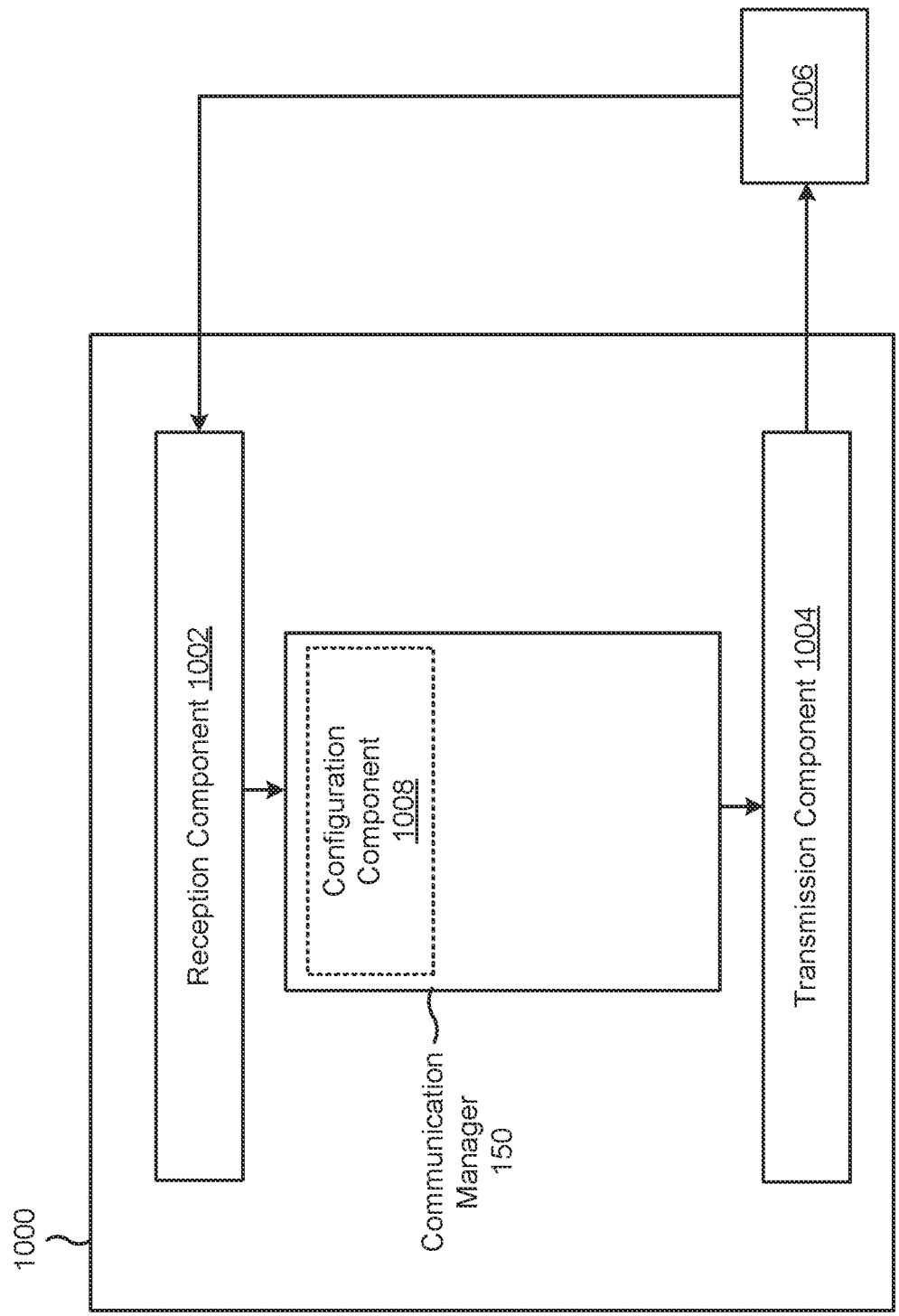

FIG. 10 is a diagram of an example apparatus 1000 for wireless communication. The apparatus 1000 may be a network entity, or a network entity may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a network entity, or another wireless communication device) using the reception component 1002 and the transmission component 1004. As further shown, the apparatus 1000 may include the communication manager 150. The communication manager 150 may include a configuration component 1008, among other examples.

In some aspects, the apparatus 1000 may be configured to perform one or more operations described herein in connection with FIGS. 4-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network entity described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network entity described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network entity described in connection with FIG. 2. In some aspects, the transmission component 1004 may be co-located with the reception component 1002 in a transceiver.

The transmission component 1004 may transmit a TB to a UE, wherein the UE fails to successfully decode the TB. The reception component 1002 may receive a NACK message based at least in part on the UE failing to successfully decode the TB, wherein the NACK message indicates a quantity of repetitions for retransmitting the TB.

The configuration component 1008 may configure the UE with a lookup table for determining the quantity of repetitions based at least in part on one or more channel metrics associated with a channel via which the TB was received.

The configuration component 1008 may configure the UE with a target reliability associated with the UE receiving the TB.

The transmission component 1004 may transmit a quantity of retransmissions of the TB, wherein the quantity of retransmissions of the TB is transmitted via a set of resources, and wherein the set of resources is determined based at least in part on the quantity of repetitions indicated in the NACK message.

The transmission component 1004 may transmit a quantity of retransmissions of the TB, wherein the quantity of retransmissions of the TB corresponds to the quantity of repetitions indicated in the NACK message.

The transmission component 1004 may transmit a quantity of retransmissions of the TB, wherein the quantity of retransmissions of the TB is different than the quantity of repetitions indicated in the NACK message.

The transmission component 1004 may transmit a configuration indicating a type of traffic for which the quantity of repetitions is determined, wherein the TB is associated with the type of traffic.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a UE, comprising: receiving a TB; and transmitting, when the UE fails to successfully decode the TB, a NACK message, wherein the NACK message indicates a quantity of repetitions for retransmitting the TB.

Aspect 2: The method of Aspect 1, wherein the quantity of repetitions is determined based at least in part on a first SINR associated with receiving the TB and a second SINR associated with decoding the TB for a modulation and coding scheme value associated with the TB.

Aspect 3: The method of Aspect 2, wherein the quantity of repetitions is determined further based at least in part on one or more of a frequency variation associated with the first SINR or a spatial variation associated with the first SINR.

Aspect 4: The method of one or more of Aspects 1 through 3, wherein the TB is transmitted with a DMRS pilot, wherein a channel quality experienced by the TB is determined based at least in part on the DMRS pilot, and wherein the quantity of repetitions is determined based at least in part on the channel quality experienced by the TB.

Aspect 5: The method of one or more of Aspects 1 through 4, wherein the UE is configured with a lookup table for determining the quantity of repetitions based at least in part on one or more channel metrics associated with a channel via which the TB was received, the method further comprising: utilizing the lookup table to determine the quantity of repetitions.

Aspect 6: The method of one or more of Aspects 1 through 5, wherein the UE is configured with a target reliability associated with the UE receiving the TB, the method further comprising: determining the quantity of repetitions based at least in part on the target reliability.

Aspect 7: The method of one or more of Aspects 1 through 6, further comprising: receiving a quantity of retransmissions of the TB, wherein the quantity of retransmissions of the TB is received via a set of resources, and wherein the set of resources is determined based at least in part on the quantity of repetitions indicated in the NACK message.

Aspect 8: The method of one or more of Aspects 1 through 7, wherein the quantity of repetitions includes a range of values.

Aspect 9: The method of one or more of Aspects 1 through 8, further comprising: receiving a quantity of retransmissions of the TB, wherein the quantity of retransmissions of the TB corresponds to the quantity of repetitions indicated in the NACK message.

Aspect 10: The method of one or more of Aspects 1 through 9, further comprising: receiving a quantity of retransmissions of the TB, wherein the quantity of retransmissions of the TB is different than the quantity of repetitions indicated in the NACK message.

Aspect 11: The method of one or more of Aspects 1 through 10, wherein the NACK message indicates a redundancy version associated with the quantity of repetitions.

Aspect 12: The method of Aspect 11, wherein the redundancy version associated with the quantity of repetitions is different than a redundancy version associated with receiving the TB.

Aspect 13: The method of Aspect 11, wherein the redundancy version associated with the quantity of repetitions is the same as a redundancy version associated with receiving the TB.

Aspect 14: The method of one or more of Aspects 1 through 13, further comprising: receiving a configuration indicating a type of traffic for which the quantity of repetitions is determined, wherein the TB is associated with the type of traffic.

Aspect 15: The method of Aspect 14, wherein the type of traffic includes one or more of augmented reality traffic, virtual reality traffic, or extended reality traffic.

Aspect 16: A method of wireless communication performed by a network entity, comprising: transmitting a TB to a UE, wherein the UE fails to successfully decode the TB; and receiving a NACK message based at least in part on the UE failing to successfully decode the TB, wherein the NACK message indicates a quantity of repetitions for retransmitting the TB.

Aspect 17: The method of Aspect 16, wherein the quantity of repetitions is determined based at least in part on a first SINR associated with transmitting the TB and a second SINR associated with the UE decoding the TB for a modulation and coding scheme value associated with the TB.

Aspect 18: The method of Aspect 17, wherein the quantity of repetitions is determined further based at least in part on one or more of a frequency variation associated with the first SINR or a spatial variation associated with the first SINR.

Aspect 19: The method of one or more of Aspects 16 through 18, wherein the TB is transmitted with a DMRS pilot, wherein a channel quality experienced by the TB is determined based at least in part on the DMRS pilot, and wherein the quantity of repetitions is determined based at least in part on the channel quality experienced by the TB.

Aspect 20: The method of one or more of Aspects 16 through 19, further comprising: configuring the UE with a lookup table for determining the quantity of repetitions based at least in part on one or more channel metrics associated with a channel via which the TB was received.

Aspect 21: The method of one or more of Aspects 16 through 20, further comprising: configuring the UE with a target reliability associated with the UE receiving the TB.

Aspect 22: The method of one or more of Aspects 16 through 21, further comprising: transmitting a quantity of retransmissions of the TB, wherein the quantity of retransmissions of the TB is transmitted via a set of resources, and wherein the set of resources is determined based at least in part on the quantity of repetitions indicated in the NACK message.

Aspect 23: The method of one or more of Aspects 16 through 22, wherein the quantity of repetitions includes a range of values.

Aspect 24: The method of one or more of Aspects 16 through 23, further comprising: transmitting a quantity of retransmissions of the TB, wherein the quantity of retransmissions of the TB corresponds to the quantity of repetitions indicated in the NACK message.

Aspect 25: The method of one or more of Aspects 16 through 24, further comprising: transmitting a quantity of retransmissions of the TB, wherein the quantity of retransmissions of the TB is different than the quantity of repetitions indicated in the NACK message.

Aspect 26: The method of one or more of Aspects 16 through 25, wherein the NACK message indicates a redundancy version associated with the quantity of repetitions.

Aspect 27: The method of Aspect 26, wherein the redundancy version associated with the quantity of repetitions is different than a redundancy version associated with receiving the TB.

Aspect 28: The method of Aspect 26, wherein the redundancy version associated with the quantity of repetitions is the same as a redundancy version associated with receiving the TB.

Aspect 29: The method of one or more of Aspects 16 through 28, further comprising: transmitting a configuration indicating a type of traffic for which the quantity of repetitions is determined, wherein the TB is associated with the type of traffic.

Aspect 30: The method of Aspect 29, wherein the type of traffic includes one or more of augmented reality traffic, virtual reality traffic, or extended reality traffic.

Aspect 31: An apparatus for wireless communication at a device, comprising a processor; memory coupled with the processor; and instructions stored in the memory and executable by the processor to cause the apparatus to perform the method of one or more of Aspects 1 through 15.

Aspect 32: A device for wireless communication, comprising a memory and one or more processors coupled to the memory, the one or more processors configured to perform the method of one or more of Aspects 1 through 15.

Aspect 33: A device for wireless communication, comprising memory, and one or more processors coupled to the memory, the memory comprising instructions executable by the one or more processors to cause the device to perform the method of one or more of Aspects 1-15.

Aspect 34: An apparatus for wireless communication, comprising at least one means for performing the method of one or more of Aspects 1 through 15.

Aspect 35: A non-transitory computer-readable medium storing code for wireless communication, the code comprising instructions executable by a processor to perform the method of one or more of Aspects 1 through 15.

Aspect 36: A non-transitory computer-readable medium storing a set of instructions for wireless communication, the set of instructions comprising one or more instructions that, when executed by one or more processors of a device, cause the device to perform the method of one or more of Aspects 1 through 15.

Aspect 37: An apparatus for wireless communication at a device, comprising a processor; memory coupled with the processor; and instructions stored in the memory and executable by the processor to cause the apparatus to perform the method of one or more of Aspects 16 through 30.

Aspect 38: A device for wireless communication, comprising a memory and one or more processors coupled to the memory, the one or more processors configured to perform the method of one or more of Aspects 16 through 30.

Aspect 39: A device for wireless communication, comprising memory, and one or more processors coupled to the memory, the memory comprising instructions executable by the one or more processors to cause the device to perform the method of one or more of Aspects 16-30.

Aspect 40: An apparatus for wireless communication, comprising at least one means for performing the method of one or more of Aspects 16 through 30.

Aspect 41: A non-transitory computer-readable medium storing code for wireless communication, the code comprising instructions executable by a processor to perform the method of one or more of Aspects 16 through 30.

Aspect 42: A non-transitory computer-readable medium storing a set of instructions for wireless communication, the set of instructions comprising one or more instructions that, when executed by one or more processors of a device, cause the device to perform the method of one or more of Aspects 16 through 30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors coupled to the one or more memories, the one or more memories storing instructions configurable to be executed by the one or more processors to cause the UE to:
   receive a transport block (TB) transmitted with a demodulation reference signal (DMRS) pilot; and
   transmit, when the UE fails to successfully decode the TB, a negative acknowledgement (NACK) message, wherein the NACK message indicates a quantity of repetitions for retransmitting the TB, wherein the quantity of repetitions is based at least in part on one or more of a variation in a signal-to-interference-plus-noise ratio (SINR) or a channel quality associated with a channel via which the TB was communicated, and wherein the channel quality is determined based at least in part on the DMRS pilot.

2. The UE of claim 1, wherein the quantity of repetitions is determined based at least in part on a first SINR associated with receiving the TB and a second SINR associated with decoding the TB for a modulation and coding scheme value associated with the TB.

3. The UE of claim 2, wherein the variation in the SINR comprises a frequency variation associated with the first SINR or a spatial variation associated with the first SINR.

4. The UE of claim 1, wherein the UE is configured with a lookup table for determining the quantity of repetitions based at least in part on one or more channel metrics associated with the channel, wherein the instructions configurable to be executed are further executable by the one or more processors to cause the UE to:
   utilize the lookup table to determine the quantity of repetitions.

5. The UE of claim 1, wherein the UE is configured with one or more of a delay budget or a target reliability associated with the UE receiving the TB, wherein the instructions configurable to be executed are further executable by the one or more processors to cause the UE to:
   determine the quantity of repetitions based at least in part on the one or more of the delay budget or the target reliability.

6. The UE of claim 1, wherein the instructions configurable to be executed are further executable by the one or more processors to cause the UE to:
   receive a quantity of retransmissions of the TB, wherein the quantity of retransmissions of the TB is received via a set of resources, and wherein the set of resources is determined based at least in part on the quantity of repetitions.

7. The UE of claim 1, wherein the TB includes a plurality of code blocks, wherein the UE transmits the NACK message when the UE fails to successfully decode a group of code blocks, of the plurality of code blocks, and wherein the NACK message indicates a quantity of repetitions for retransmitting the group of code blocks.

8. The UE of claim 1, wherein the instructions configurable to be executed are further executable by the one or more processors to cause the UE to:
   receive a quantity of retransmissions of the TB, wherein the quantity of retransmissions of the TB corresponds to the quantity of repetitions.

9. The UE of claim 1, wherein the instructions configurable to be executed are further executable by the one or more processors to cause the UE to:
   receive a quantity of retransmissions of the TB, wherein the quantity of retransmissions of the TB is different than the quantity of repetitions.

10. The UE of claim 1, wherein the NACK message indicates a redundancy version associated with the quantity of repetitions.

11. The UE of claim 10, wherein the redundancy version associated with the quantity of repetitions is different than a redundancy version associated with receiving the TB.

12. The UE of claim 10, wherein the redundancy version associated with the quantity of repetitions is the same as a redundancy version associated with receiving the TB.

13. The UE of claim 1, wherein the instructions configurable to be executed are further executable by the one or more processors to cause the UE to:

receive a configuration indicating a type of traffic for which the quantity of repetitions is determined, wherein the TB is associated with the type of traffic.

14. A network entity for wireless communication, comprising:
one or more memories; and
one or more processors coupled to the one or more memories, the one or more memories storing instructions configurable to be executed by the one or more processors to cause the network entity to:
transmit a transport block (TB) with a demodulation reference signal (DMRS) pilot to a user equipment (UE), wherein the UE fails to successfully decode the TB; and
receive a negative acknowledgement (NACK) message based at least in part on the UE failing to successfully decode the TB, wherein the NACK message indicates a quantity of repetitions for retransmitting the TB, wherein the quantity of repetitions is based at least in part on one or more of a variation in a signal-to-interference-plus-noise ratio (SINR) or a channel quality associated with a channel via which the TB was communicated, and wherein the channel quality is determined based at least in part on the DMRS pilot.

15. The network entity of claim 14, wherein the quantity of repetitions is determined based at least in part on a first SINR associated with transmitting the TB and a second SINR associated with the UE decoding the TB for a modulation and coding scheme value associated with the TB.

16. The network entity of claim 15, wherein the variation in the SINR comprises a frequency variation associated with the first SINR or a spatial variation associated with the first SINR.

17. The network entity of claim 14, wherein the instructions configurable to be executed are further executable by the one or more processors to cause the network entity to:
configure the UE with a lookup table for determining the quantity of repetitions based at least in part on one or more channel metrics associated with the channel.

18. The network entity of claim 14, wherein the instructions configurable to be executed are further executable by the one or more processors to cause the network entity to:
configure the UE with one or more of a delay budget or a target reliability associated with the UE receiving the TB.

19. The network entity of claim 14, wherein the instructions configurable to be executed are further executable by the one or more processors to cause the network entity to:
transmit a quantity of retransmissions of the TB, wherein the quantity of retransmissions of the TB is transmitted via a set of resources, and wherein the set of resources is determined based at least in part on the quantity of repetitions.

20. The network entity of claim 14, wherein the quantity of repetitions includes a range of values.

21. The network entity of claim 14, wherein the instructions configurable to be executed are further executable by the one or more processors to cause the network entity to:
transmit a quantity of retransmissions of the TB, wherein the quantity of retransmissions of the TB corresponds to the quantity of repetitions.

22. The network entity of claim 14, wherein the instructions configurable to be executed are further executable by the one or more processors to cause the network entity to:
transmit a quantity of retransmissions of the TB, wherein the quantity of retransmissions of the TB is different than the quantity of repetitions.

23. The network entity of claim 14, wherein the NACK message indicates a redundancy version associated with the quantity of repetitions.

24. The network entity of claim 23, wherein the redundancy version associated with the quantity of repetitions is different than a redundancy version associated with receiving the TB.

25. The network entity of claim 23, wherein the redundancy version associated with the quantity of repetitions is the same as a redundancy version associated with receiving the TB.

26. The network entity of claim 14, wherein the instructions configurable to be executed are further executable by the one or more processors to cause the network entity to:
transmit a configuration indicating a type of traffic for which the quantity of repetitions is determined, wherein the TB is associated with the type of traffic.

27. A method of wireless communication performed by an apparatus of a user equipment (UE), comprising:
receiving a transport block (TB) transmitted with a demodulation reference signal (DMRS) pilot; and
transmitting, when the UE fails to successfully decode the TB, a negative acknowledgement (NACK) message, wherein the NACK message indicates a quantity of repetitions for retransmitting the TB, wherein the quantity of repetitions is based at least in part on one or more of a variation in a signal-to-interference-plus-noise ratio (SINR) or a channel quality associated with a channel via which the TB was communicated, and wherein the channel quality is determined based at least in part on the DMRS pilot.

28. A method of wireless communication performed by an apparatus of a network entity, comprising:
transmitting a transport block (TB) with a demodulation reference signal (DMRS) pilot to a user equipment (UE), wherein the UE fails to successfully decode the TB; and
receiving a negative acknowledgement (NACK) message based at least in part on the UE failing to successfully decode the TB, wherein the NACK message indicates a quantity of repetitions for retransmitting the TB, wherein the quantity of repetitions is based at least in part on one or more of a variation in a signal-to-interference-plus-noise ratio (SINR) or a channel quality associated with a channel via which the TB was communicated, and wherein the channel quality is determined based at least in part on the DMRS pilot.

* * * * *